Feb. 7, 1961
C. B. BAKER
2,970,552
CARGO SECURING APPARATUS
Filed Feb. 26, 1959
3 Sheets-Sheet 1
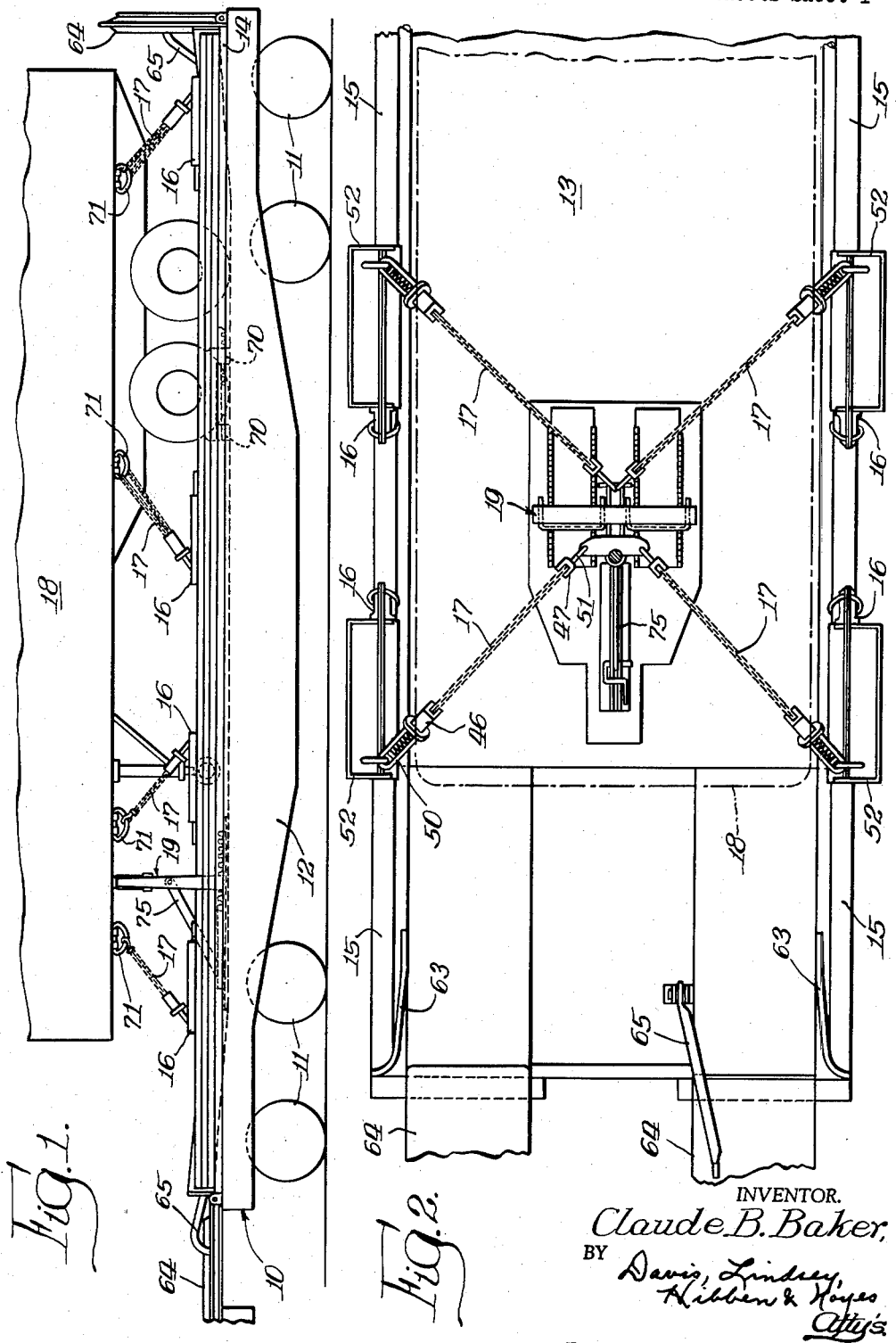
INVENTOR.
Claude B. Baker,
BY Davis, Lindsey,
Hibben & Noyes
Attys Feb. 7, 1961
C. B. BAKER
2,970,552
CARGO SECURING APPARATUS
Filed Feb. 26, 1959
3 Sheets-Sheet 2
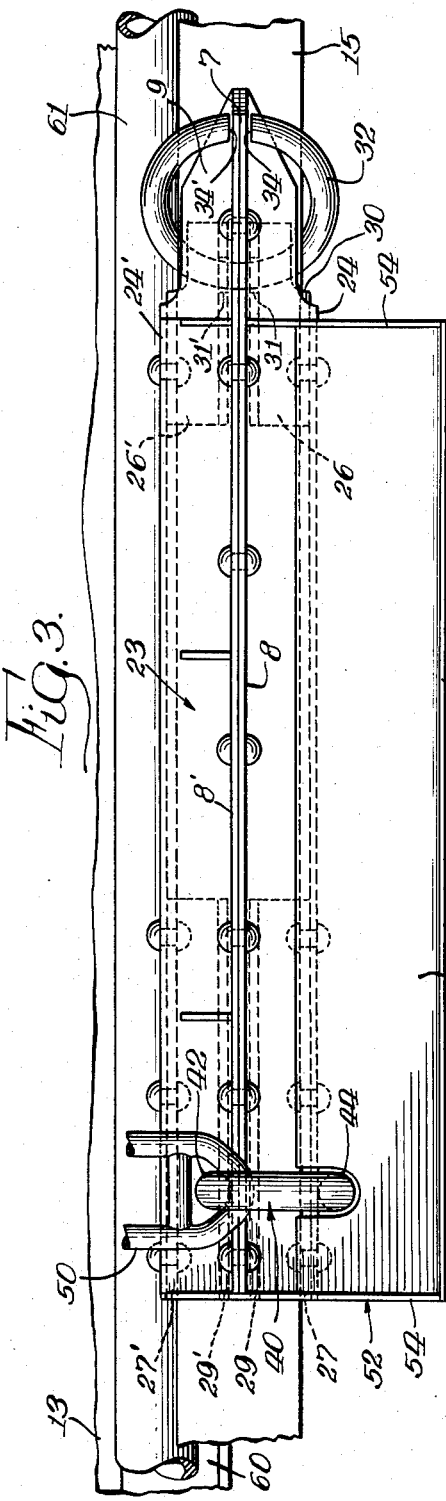
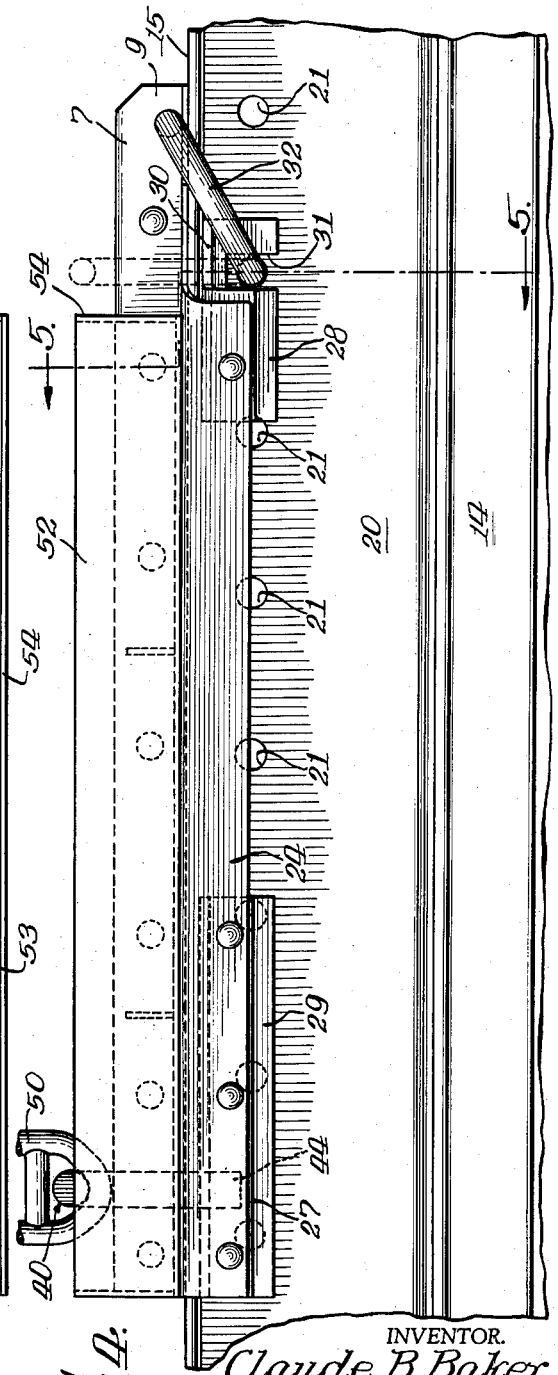
INVENTOR.
Claude B. Baker
BY Davis, Lindsey,
Hibben & Noyes
Atty's

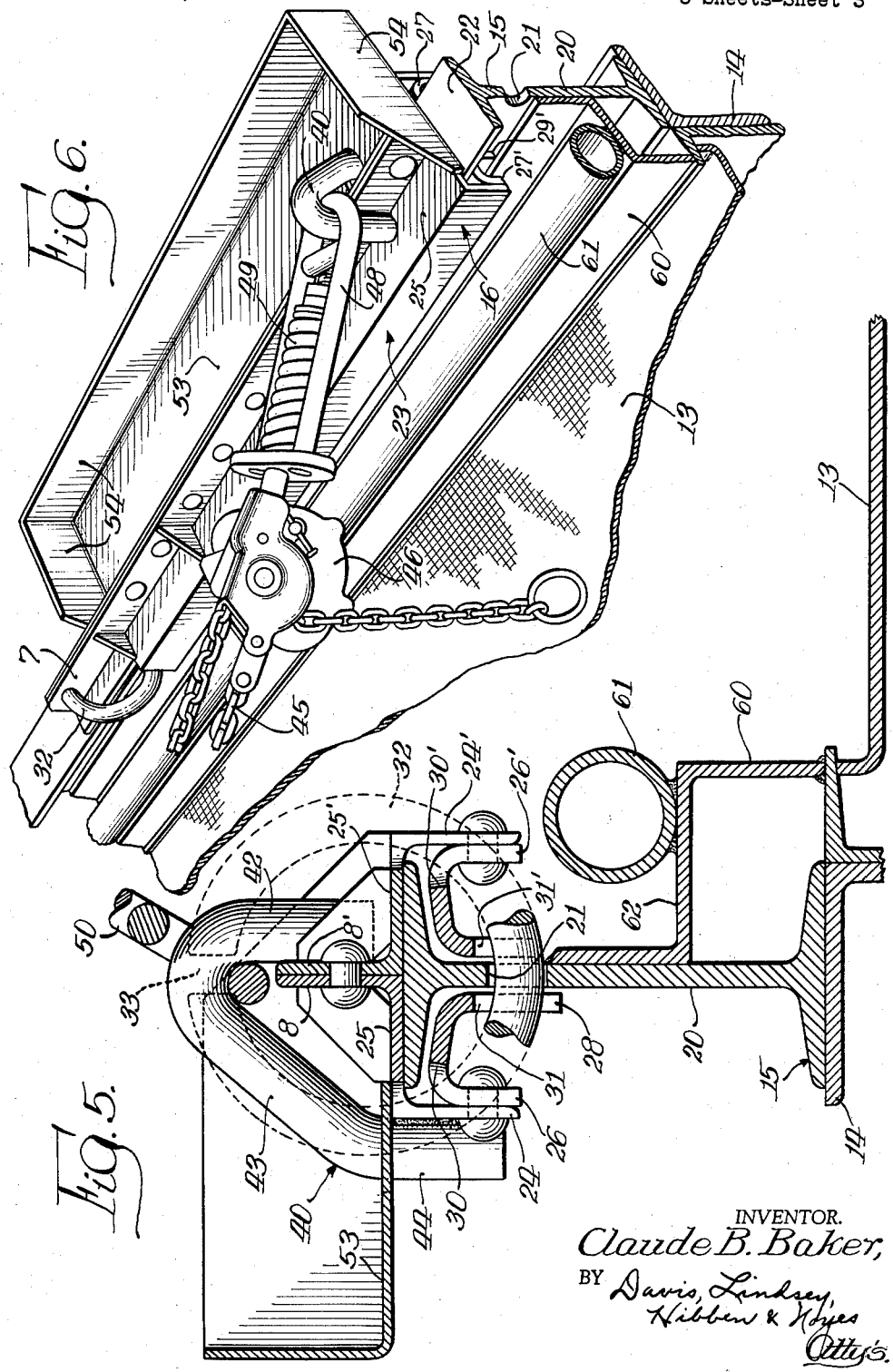

United States Patent Office 2,970,552
Patented Feb. 7, 1961

2,970,552
CARGO SECURING APPARATUS
Claude B. Baker, Chicago, Ill., assignor to Illinois Central Railroad Company, Chicago, Ill., a corporation of Illinois
Filed Feb. 26, 1959, Ser. No. 795,862
9 Claims. (Cl. 105—368)

The invention relates generally to hold-down means for securing cargo on a carrier, and more particularly to a hold-down anchor for securing a highway trailer unit on a railway car, barge, or the like, as in the so-called "piggy-back" service.

In the "piggy-back" service, the cargo carrying trailer of a trailer-tractor highway vehicle is run on to a railway car, such as a flat car, where it is secured and is then carried by rail to a distant rail terminal where it is pulled by another highway vehicle tractor to its destination. Among the problems encountered in such a system is the undesirable longitudinal and lateral movement of the highway trailer while it is mounted on the railway car, particularly when the railway car is being coupled or being switched in the rail yards and also during travel between rail terminals. If the movement of the trailer is not controlled, considerable damage to the trailer and the contents thereof frequently occurs. It is also very important to effectively secure the trailer on the railway car with a minimum of equipment and as conveniently as possible to minimize the over-all expense involved.

It is, therefore, an object of the present invention to provide improved hold-down apparatus for securing cargo on a carrier.

It is a further object of the present invention to provide improved hold-down apparatus for a railway car which permits more rapidly securing cargo thereto.

It is a still further object of the invention to provide improved hold-down apparatus for securing a highway trailer unit on a railway car which effectively controls the lateral and longitudinal movement of the trailer.

It is another object of the present invention to provide an improved hold-down apparatus for securing highway trailers of varying dimensions to a railway car.

It is still another object of the present invention to provide an improved hold-down anchor for securing a hold-down tie to a carrier.

Other objects of the present invention will be apparent to those skilled in the art from the detailed description and claims to follow.

The attainment of the foregoing objects and other objects will be fully understood by those skilled in the art from the following detailed description and accompanying drawing wherein:

Figure 1 is a fragmentary side elevational view of a railway car and trailer mounted therein showing the hold-down apparatus of the present invention operatively engaging a trailer body;

Fig. 2 is a fragmentary plan view of the railway car and hold-down apparatus of Figure 1, showing the hold-down apparatus operatively engaging a fifth-wheel supporting means;

Fig. 3 is a top plan view on an enlarged scale, of the hold-down anchor means of Figs. 1 and 2, operatively mounted on the railway car;

Fig. 4 is a side elevational view of the anchor means of Fig. 3;

Fig. 5 is a vertical sectional view along the line 5—5 of Fig. 4; and

Fig. 6 is a perspective view partially in vertical section of the hold-down anchor of Figs. 1–5.

The embodiment of the present invention illustrated generally in Figs. 1 and 2 of the drawing and shown in detail in Figs. 3–6 of the drawing, comprises a railway flat car 10 with a truck 11 at each end, and an underframe 12 mounted on the trucks 11 in the usual manner. The underframe 12 supports the car deck 13 and side girders 14 which extend longitudinally of the car slightly above the deck 13. Each of the two oppositely disposed side girders 14 extending substantially the length of the car supports on the upper surface thereof an anchor rail 15 which extends longitudinally along the lateral margins of the car deck. A plurality of hold-down anchors 16 are secured to the anchor rail 15 and are adapted to be movably positioned thereon. Each anchor 16 has secured thereto a hold-down tie means 17 which is adapted to be detachably fastened to the cargo mounted on the railway car, such as the trailer body 18 and the trailer fifth-wheel supporting means 19 which supports the forward end of the trailer body 18 above the car deck after the tractor unit has been disengaged therefrom. The trailer fifth-wheel supporting means 19 is described in detail in my co-pending application for U.S. Letters Patent Serial No. 796,024, filed February 27, 1959.

The anchor rails 15 which are welded or otherwise fixedly secured and are co-extensive with the side girders 14 of the railway car serve as a retaining anchorage for the hold-down anchors 16 and have an I beam section with an enlarged flat head and an upstanding web section 20 thereof normally disposed in a vertical plane. The web section 20 is apertured transversely at spaced points along the length thereof to provide spaced passages 21 extending therethrough adjacent its upper end. On the flat head or top flange surface 22 of the anchor rail 15 are slidably mounted a plurality of hold-down anchors 16.

Each of the hold-down anchors 16 comprises an elongated frame section 23 having a flat lower surface adapted to ride on the upper surface 22 of the rail 15 and having depending lateral flange sections 24, 24' which extend downwardly over the edge of the rail 15. The frame section 23 is conveniently formed of two structural members 25, 25' having a Z bar section with the abutting upwardly extending flanges thereof joined by welding or riveting to form a centrally disposed stop section 7 with vertically extending lateral surfaces 8, 8', as best shown in Figs. 3–5 of the drawing. The forward ends of the lateral flange sections 24, 24' are removed to provide a narrow nose section 9 which accommodates a locking means to be described hereinafter.

Secured to the inner surfaces of the opposite depending lateral flange sections 24, 24' adjacent the opposite ends of the frame section 23 are a pair of oppositely disposed U-shaped guide sections 26, 26' and 27, 27', respectively. Each of the said guide sections are adapted to ride under the top flange or upper surface 22 of the anchor rail 15 and are disposed with the arms 28, 28' and 29, 29', respectively, extending downwardly adjacent the web of the anchor rail 15. At least one of the arms of each guide section, such as arms 28 and 29, extends below the passages 21 in the rail 15. The said guide sections together with the frame section 23 retain the anchor 16 on the rail 15.

The guide sections 26, 26' at the forward end of the frame section 23 are slotted, as at 30, 30' and 31, 31', to provide passageways therethrough which can be aligned with the passages 21 in the web of the anchor rail 15 in one of a plurality of positions along the rail 15. The passageways 30, 30', 31, 31' are of a width which freely allows the insertion therein of an open or C-shaped locking ring 32 (Figs. 3 and 5) to adjustably lock the hold-down anchor 16 in the desired position on the rail 15.

The locking ring 32 is formed with a gap 33 so that the opposed ends 34, 34' of the ring 32 are spaced a distance greater than the thickness of the web section 20 of the rail 15 adjacent the aperture 21, thereby permitting longitudinal movement of the anchor 16 along the rail 15 when the ring 32 is moved out of the passage 21. The ends of the locking ring 32 are also spaced a distance sufficient to permit the ends 34, 34' of the ring to be positioned on opposite sides of the abutting upwardly extending center stop section 7 of the frame 23, as best seen in Fig. 3. Thus, with the ring 32 positioned with the opposed ends on opposite sides of stop section 7, the ring 32 is restrained from being rotated about an axis parallel to the longitudinal axis of the anchor 16 and cannot be moved out of the passage 21, thereby locking the anchor 16 in position on the rail 15. The ring 32 is also adapted to be pivotally movable longitudinally of the frame section 23 for swinging the spaced ends 34, 34' thereof into and out of locking engagement with the opposite lateral surfaces 8, 8' of the stop section 7.

A loop or anchor ring 40 is fixedly secured to the frame section 23 of the anchor 16, preferably on the end opposite the locking ring 32, and extends above the upper surface of the frame 23. The loop 40 serves as a point of attachment for the lower end of the hold-down tie means 17. As shown in Fig. 5, the loop 40 has an irregular curvature with the upper angular portion forming the point of attachment for the hold-down tie means 17 which is disposed substantially in the vertical plane of the longitudinal axis of the frame section 23 and is formed by a substantially vertical short inner leg section 42 secured to the upwardly extending center section 8' which merges with an elongated inclined outer leg section 43 which has the lower end 44 extending therefrom secured to the outer depending flange 24 of the anchor frame. The outer inclined leg section 43 lies generally in the plane of the tension applied by the hold-down tie means 17, thereby providing a more uniform distribution of the forces applied to the anchor 16 and anchor rail 15 during actual operation.

The hold-down tie means 17 is comprised of a length of chain 45 having one end secured to a chain hoist 46 with the chain looped over a pulley block 47 and the end section of the chain in engagement with the tightening mechanism of the hoist 46, thereby making possible a very rapid adjustment of the tension of the chain by movement of the chain hoist 46. The hoist 46 is secured to the anchor 16 through a spring coupling means 48 comprising a strong helical spring 49 mounted in a yoke 50 secured to the loop 40. The pulley block 47 has a snap hook 51 fastened thereto which permits quickly connecting or disconnecting the hold-down means 17 with a trailer or other cargo.

The frame section 23 of the anchor 16 is also provided with a compartment 52 for storing the hold-down tie means 17 when not attached to a trailer or other cargo. The storage compartment 52 is formed of a generally rectangular base 53 with upstanding lateral walls 54 with the base 53 being fixedly attached along at least the inner edge thereof to the frame section 23 (Fig. 5) and extending outwardly in a generally horizontal plane so that the car deck is not obstructed. The compartment 52 also serves as a convenient stand for the trainmen during the adjustment of the hold-down apparatus.

Also disposed along the deck of the car and extending longitudinally thereof is a Z-bar 60 which is secured to the rail 15 and the car deck 13 projecting inwardly of the rail 15. The Z-bar 60 has a pipe 61 affixed to the upper horizontal surface 62 and extending inwardly thereof. The Z-bar 60 serves as additional lateral support for the rail 15 and the pipe 61 thereon acts as a guard to protect the tires of the trailer and also serves to protect the anchor rail 15 against damage by the trailer. The ends of the pipe 61 have affixed thereto a transversely curved guide rail 63 (Fig. 2) which protects the ends of the pipe 61 and helps to guide the trailer wheels onto the car deck in the event the wheels are not properly aligned therewith. The guide rail 63 also serves as an end cap for the anchor rail 15 and retains the anchors 16 thereon.

The ends of the car 10 are provided with one or more aprons 64 (Figs. 1 and 2) which are pivotally mounted thereon and which serve as extensions of the deck so as to connect with the adjacent railway car deck and provides a bridge between the decks of the car over which the trailers can pass. When not in use, the aprons are raised to an elevated position and are thus held by a latch means 65 (Fig. 1).

The hold-down anchors 16 constructed as described herein are operatively positioned on the anchor rail 15 by sliding the anchor 16 over the end of the rail 15 after which the guide rail 63 is positioned at the ends of the rail. In the embodiments illustrated in Figs. 1 and 2 of the drawing, four of the anchor means 16 are provided for securing the front of each trailer, and four anchor means are provided for securing the rear of each trailer.

In operation according to the embodiment illustrated in Fig. 2 of the drawing, a trailer is positioned along the center line of the car with the king pin thereof positioned over the fifth wheel supporting means 19 and the wheels securely chocked with dual safety wheel blocks 70 (Fig. 1). The auxiliary wheels of the trailer are then lowered, the tractor uncoupled from the trailer, and the fifth-wheel supporting means 19 with its king pin coupling means positioned directly behind the king pin of the trailer, after which the fifth-wheel supporting means 19 is secured by fastening the end of the supporting means diagonal member 75. The front end of the trailer is then raised by the tractor's hydraulic lift to permit adjustment of the auxiliary wheels above the car deck, and the trailer lowered onto the fifth-wheel supporting means 19. The snap hooks 51 are then fastened to the fifth-wheel supporting means 19 after moving the anchors 16 into position along the anchor rails 15 after first rotating the locking rings 32 until they clear the passages 21. The anchors 16 are then finally positioned on the rails 15 so that each of the hold-down means makes an angle of roughly 45° with the car deck and so as to provide diagonally opposite tension on the fifth-wheel supporting means, as best seen in Fig. 2. With the anchors 16 thus positioned, the locking ring 32 is rotated so that it enters passage 21 and prevents longitudinal movement thereof along the rail 15. The locking ring 32 is secured in locking position by pivotally moving the ring 32 longitudinally to place the ends of the ring 32 on opposite sides of the upwardly extending flange sections or stop portion 8 of the anchor frame 23. The rear end of the trailer can then be secured by fastening the hold-down tie means 17 about the rear wheels or axle assembly and positioning the anchors 16 as above described.

When the trailer 10 has oppositely disposed hold-down connectors, such as D-rings 71, secured to the lower portions adjacent the front end and back end thereof, as shown in Fig. 1, the hold-down tie means 17 are secured to the D-rings in the same general manner as described heretofore, and the trailer is held securely on the car deck 13.

The tension of the oppositely disposed hold-down means 17 is adjusted by means of the respective chain hoists 46 associated therewith, so that the trailer is held in a central position on the car 10. Care should be exercised in tightening each chain hoist 46 so that the spring coupling means is not compressed initially more than about 40% of its total length. Thus, with a spring having a total travel of about 1⅛", compressing the said spring about ¼" to ½" will load the spring to about 2000 pounds and generally prevents the spring being fully loaded under any of the conditions encountered in actual use. With the spring coupling means thus adjusted, the hold-down means of the present invention provides a very strong and resilient connection for securing a trailer, or other cargo, on the carrier body, and protects the trailer and its contents against damage due to conditions encountered during transit thereof.

The procedure for unloading the carrier equipped with the hold-down means of the present invention is substantially the reverse of that followed in loading the carrier and involves lowering the aprons 64 and unhooking the hold-down means from the trailer and fifth-wheel supporting means. Each of the hold-down means is then placed in its respective compartment 52 clear of the deck to prevent damage to the anchor means and to the tires of the trailer or tractor. The fifth-wheel supporting means is unsecured and is knocked over by the tractor when it couples with the trailer. The wheels are unchocked and the trailer removed from the railway car 10.

It will be clear from the foregoing description, that the present invention in its various applications provides a very effective versatile and reliable hold-down means for securing a trailer or other cargo on a carrier, such as a railway car, barge, ship, airplane, or the like transport vehicle where it is important to hold the trailer or other cargo securely in place during transit. It will also be understood that the hold-down anchor and associated parts of the present invention are fabricated of components which are inexpensive and readily available and therefore provide a very economical hold-down means which can be readily applied to any type of carrier without extensive structural modification thereof. And, with the chain hoist feature in combination with the ready adjustability of the hold-down anchor on the anchor rail, a minimum amount of time is required to secure a trailer or other cargo on the carrier supporting deck, thereby further reducing the over-all cost of the transport service.

Others who practice the present invention in any of the numerous ways suggested to one skilled in the art, or employ any one or more of the novel features of the present invention as disclosed herein and as defined in the appended claims should not be construed to depart from the scope of the present invention, and all such practice of the invention should be considered to be a part hereof and falls within the scope of the appended claims.

I claim:

1. In a cargo-securing means, the combination of an elongated anchor rail, an adjustable hold-down anchor slidably mounted on said rail, said rail and said anchor having cooperating apertured portions adapted to be brought into registry by movement of the anchor to a selected position along the rail, and means for releasably locking said anchor in said position comprising a ring having a gap therein, said ring being rotatable to a locked position with the ring projecting through the registered apertured portions of said rail and said anchor, and said ring also being rotatable to a released position with the gap in the ring aligned with the apertured portion of the said rail, whereby said anchor is freely movable along the rail.

2. In a cargo-securing means, the combination of an elongated anchor rail, an adjustable hold-down anchor slidably mounted on said rail, said rail and said anchor having cooperating apertured portions adapted to be brought into registry by movement of the anchor to a selected position along the rail, and means for releasably locking said anchor in said position comprising a ring with a gap carried by said anchor and extending through the apertured portion of said anchor, said ring being rotatable between a locked position with the ring projecting through the registered apertured portions of said rail and said anchor and a released position with the ring gap aligned with the apertured portion of said rail so that the anchor is freely movable along the rail, said anchor also having a stop portion adapted to fit into the gap of said ring, and said ring when in locked position being swingable about a transverse axis through the apertured portion of said rail for moving the ring gap into interfitting relation with the stop portion of said anchor, thereby preventing rotation of the ring when in locked position.

3. In an apparatus for transporting cargo including a hold-down means for securing cargo, the improvement comprising, an anchor rail extending longitudinally along a cargo supporting surface, said rail being apertured transversely to form a passage therethrough, a hold-down anchor movably secured to the said anchor rail and fastenable to a hold-down tie means, said anchor comprising an elongated frame section having guide means for engaging and maintaining engagement with the said rail, the said frame section also being apertured to form a passage which is adapted to be aligned with a passage in the said rail, and a locking ring mounted on the said frame and rotatably movable into and out of the said aperture in the rail when the said passages are in alignment, and the said ring having a portion thereof removed with the opposed end surfaces of the ring being spaced a distance greater than the thickness of the said rail, whereby the anchor is freely movable along the rail when the locking ring is moved out of the said aperture in the rail but is fixedly positioned on the rail when the said ring is moved into the said aperture in the rail.

4. An apparatus for transporting cargo as defined in claim 3, wherein the said frame section of the hold-down anchor has adjacent the locking ring a stop section having lateral surface portions with a transverse width less than the distance between the opposed ends of the said locking ring, said ring being pivotally swingable when disposed in the rail aperture for positioning the opposed end surfaces of the ring at opposite sides of the lateral surface portions of said stop section, and said ring being thereby maintained in a non-rotatable locking position until the said ring is pivotally moved to swing the opposed end surfaces of the ring out of engagement with the said lateral surface portions of the stop section.

5. An apparatus for transporting cargo as defined in claim 3, wherein the said frame section has extending upwardly therefrom an attaching loop providing a point of attachment for engaging the said hold-down tie means. said point of attachment being disposed substantially in the vertical plane of the longitudinal axis of the frame and formed with a vertically extending inner leg section which merges at its upper end with an inclined outer leg section, said outer leg section lying in a plane generally parallel with the plane of the tension applied by the said hold-down tie means.

6. An apparatus for transporting cargo as defined in claim 3, wherein the said frame section has a supporting compartment mounted thereon in spaced relation from said cargo supporting surface and extending laterally outwardly therefrom, said compartment having at least one edge section thereof secured to said frame and having upwardly extending lateral wall sections formed on the remaining edges thereof, thereby providing a supporting and storage compartment for the hold-down tie means associated with the said frame.

7. In a railway car having a cargo supporting deck surface and hold-down means for securing cargo on the deck surface, the improvement comprising in combination, an elongated anchor rail extending longitudinally along the car deck surface and a hold-down anchor slidably mounted on the said rail, said anchor rail being apertured transversely to form a plurality of transverse passages at spaced points along the rail, said hold-down anchor comprising a frame section having guide means engaging the said rail and maintaining engagement therewith, the said guide means being apertured and adapted to accommodate a locking ring, and a locking ring mounted in the apertures of the said guide means which is rotatably movable into and out of the said apertures in the rail when the apertures in the guide means are aligned wth an aperture in the rail, said ring having a portion thereof removed with the opposed end surfaces being spaced a distance greater than the thickness of the said rail, whereby the anchor is freely movable along the rail when the locking ring is moved out of the said aperture in the rail but is fixedly positioned on the rail when the said ring is moved into the said aperture in the rail.

8. The improved anchor rail and hold-down anchor for a railway car as defined in claim 7, wherein the said frame section of the said hold-down anchor has a stop section having vertically disposed lateral surfaces and a transverse width less than the distance between the opposed end surfaces of the said locking ring, and said locking ring being pivotally movable for swinging into and out of engagement with the opposed lateral surfaces of the said stop section when the ring is in locking position, and said ring being maintained in a non-rotatable locking position until the opposed end surfaces of the said ring are moved out of engagement with the said lateral surfaces.

9. In a railway car having a deck surface provided with an elongated anchor rail extending longitudinally along the car deck and means mounted on said rail for anchoring hold-down tie means, the improvement comprising an anchor rail, a hold-down anchor slidably mounted on the said rail comprising an elongated frame section having guide means for maintaining engagement with the said rail, locking means for fixedly positioning the anchor on the said rail, and an upwardly extending attaching loop mounted on the said frame section providing a point of attachment for engaging a hold-down tie means, said point of attachment for the hold-down tie means being disposed substantially in the vertical plane of the longitudinal axis of the frame section and being formed with a vertically extending inner leg section which merges at its upper end with an inclined outer leg section, said outer inclined leg section lying in a plane generally parallel with the plane of the tension applied by the said hold-down tie means.

References Cited in the file of this patent

UNITED STATES PATENTS

| | | |
|---|---|---|
| 1,934,165 | Butterworth | Nov. 7, 1933 |
| 1,934,697 | Butterworth | Nov. 14, 1933 |
| 2,024,444 | Friedlaender | Dec. 17, 1935 |
| 2,128,667 | Atherton | Aug. 30, 1938 |
| 2,227,870 | Thomas | Jan. 7, 1941 |
| 2,742,874 | Patterson | Apr. 24, 1956 |
| 2,802,429 | Storch | Aug. 13, 1957 |
| 2,837,038 | Fahland | June 3, 1958 |